United States Patent [19]

Boshears

[11] 4,383,610
[45] May 17, 1983

[54] CASSETTE RETENTION POCKET
[75] Inventor: Donald L. Boshears, Tulsa, Okla.
[73] Assignee: Pocket-Pak, Inc., Tulsa, Okla.
[21] Appl. No.: 237,851
[22] Filed: Feb. 25, 1981
[51] Int. Cl.³ .......................................... B65D 85/67
[52] U.S. Cl. .................................. 206/387; 206/476
[58] Field of Search ....................... 206/387, 476, 485
[56] References Cited
U.S. PATENT DOCUMENTS 3,746,180  7/1973  Spiroch et al. ..................... 206/387
4,248,345  2/1981  Bowers .............................. 206/387
4,287,989  9/1981  Plummer ............................ 206/387

FOREIGN PATENT DOCUMENTS 15398    9/1980  European Pat. Off. ............. 206/387
2730455  1/1979  Fed. Rep. of Germany ...... 206/387

Primary Examiner—Joseph Man-Fu Moy
Attorney, Agent, or Firm—Head, Johnson & Stevenson

[57] ABSTRACT

A cassette container or pocket made of thermoformed vinyl includes detent means capable of meshing with the openings associated with the raised tape to recorder-playback projection portion of a standard audio tape cassette.

5 Claims, 7 Drawing Figures

U.S. Patent May 17, 1983 Sheet 1 of 2 4,383,610 ically 1,383,610

CASSETTE RETENTION POCKET

CROSS REFERENCE TO RELATED APPLICATIONS

This application is an improvement upon common-assignees co-pending application Ser. No. 959,708, filed Nov. 13, 1978 now U.S. Pat. No. 4,253,567, issued Mar. 3, 1981 and incorporated herein by reference.

SUMMARY OF THE INVENTION

This invention relates to a container or a pocket for storing common audio tape cassettes and is directed to a detent or indentation located along the top edge or side edge of the pocket and is so located so as to fall or engage with the respective vertical or horizontal openings associated with the raised projection portion of the cassette. The raised flange portion is that portion oriented with respect to the recording and/or play-back mechanism of a typical 'cassette recorder'.

DESCRIPTION OF THE PREFERRED EMBODIMENT

Before explaining the present invention in detail, it is to be understood that the invention is not limited in its application to the details of construction and arrangment of parts illustrated in the accompanying drawings, since the invention is capable of other embodiments and of being practiced or carried out in the various ways. Also, it is to be understood that the phraseology or terminology employed herein is for the purpose of description and not of limitation.

Figure 1:
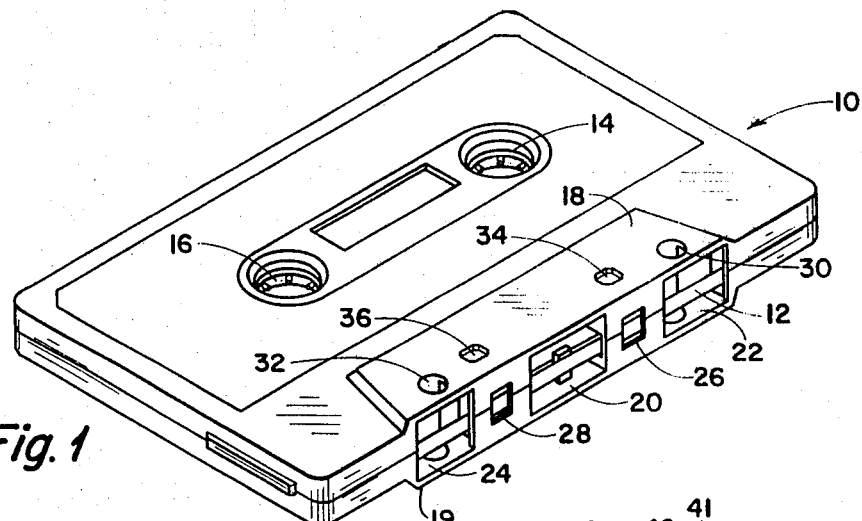
FIG. 1 is a perspective view of a typical audio tape cassette.

Referring first to FIG. 1 the audio tape cassette is generally designated by the numeral 10 formed of assembled and substantially identical halves. Tape 12 is of the common type for storing audio information and is supported within the cassette on rotatable wind and unwind reels, not seen or shown. The reels include internal hubs and gears 14 and 16 which are found between the top and bottom openings of the cassette 10. The openings and the gear wheels 14 and 16 are adapted to engage with appropriate spline shafts used in a transcriber, recorder, or playback machine capable of accepting such cassettes. The cassette case also includes, along one side, upper and lower raised projections 18 and 19 which surround and support the means to cause cooperation between the tape 12 and recording or playback mechanisms of a standard cassette recorder. This area is referred to herein as the "tape to recorder-playback intercept projection" and is standard on most cassettes. At the side of the raised portion is found primary opening 20 and a plurality of symmetrical openings 22, 24, 26 and 28 which are utilized in various means and manners with regard to the manufacture of the cassette and/or its use in a recording or playback mechanism. In addition, a plurality of vertically oriented openings 30 and 32 are adapted to receive pins or other mechanism which may be associated with the recording or playback equipment. Some cassettes include vertical openings 34 and 36 are for other functional purposes.

Figure 2:
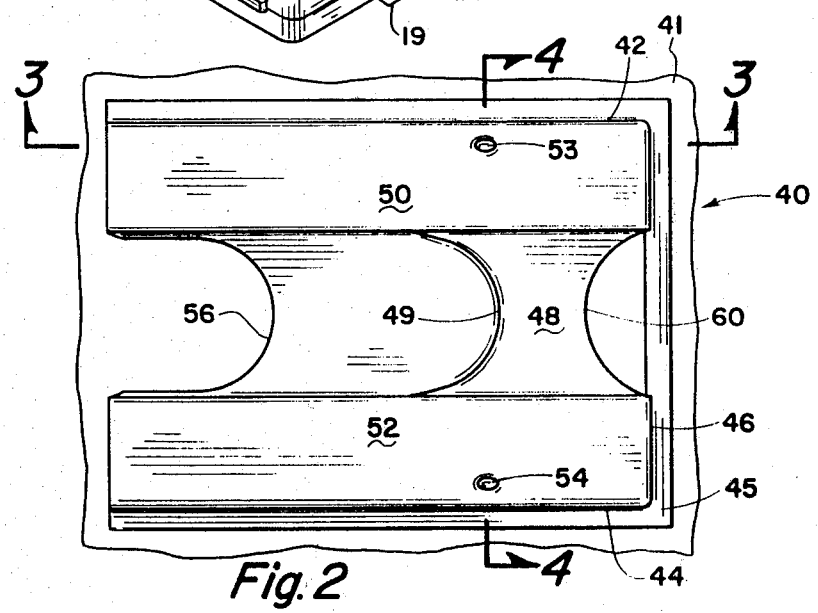
FIG. 2 is a top plan view of the container or pocket of this invention.
Figure 3:
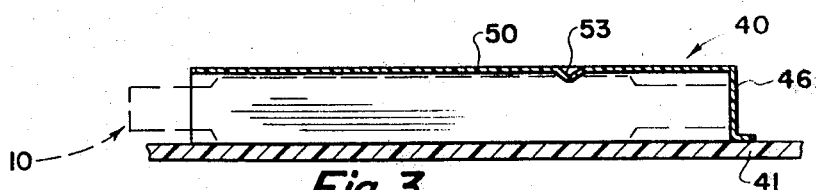
FIG. 3 is a sectional view taken along the line 3—3 of FIG. 2.
Figure 4:
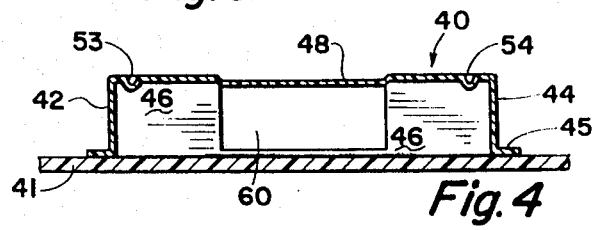
FIG. 4 is a sectional view taken along the line 4—4 of FIG. 2.
Figure 1:
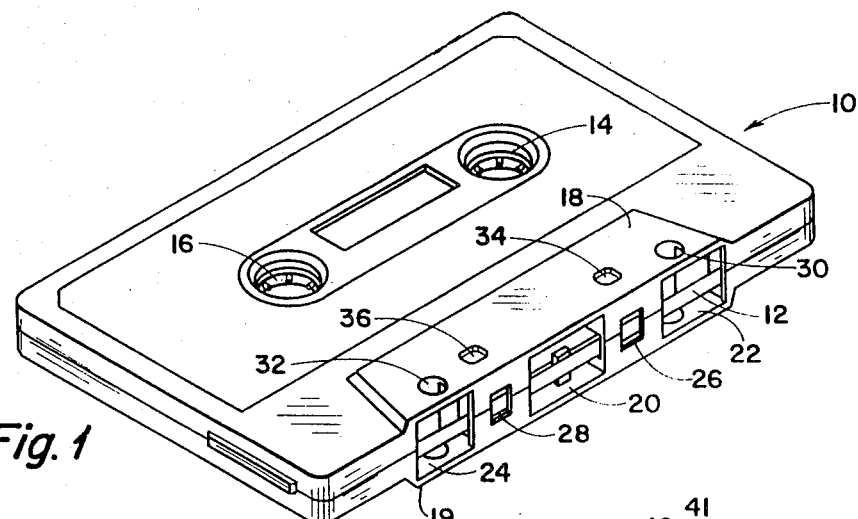
Figure 2:
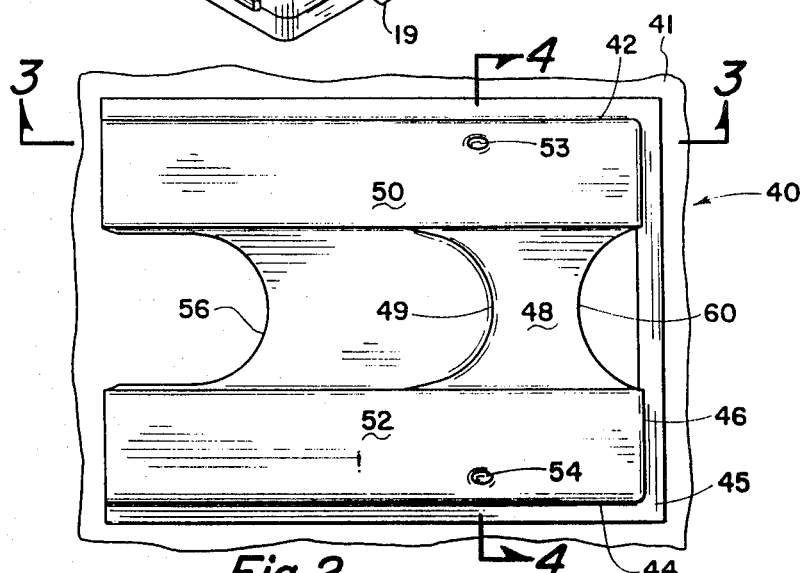
Figure 3:
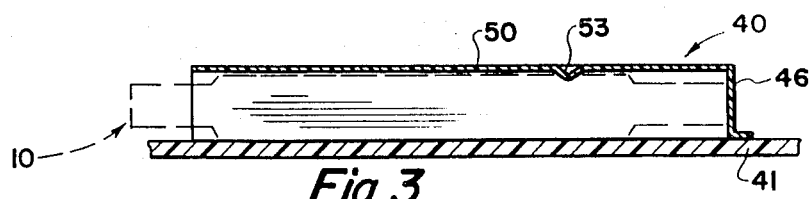
Figure 4:
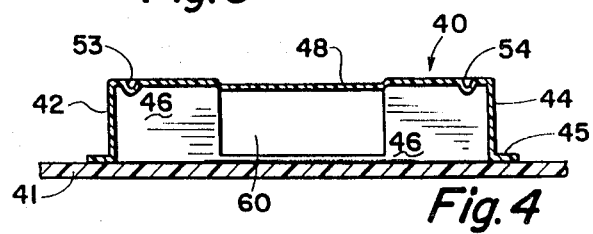

Referring now to FIGS. 2, 3 and 4 the container or pocket of this invention is generally indicated by the numeral 40 and is typically formed of vinyl, plastic or equivalent and is to be supported or attached upon a base member 41 forming the bottom surface of the pocket. The pocket includes identical sidewalls 42 and 44, a single end wall 46 and a preformed top wall having a center portion 48 between two raised portions 50 and 52, all of which are at a vertical height capable of accepting the raised projections 18 and 19 of the cassette no matter which way the cassette is inserted. The center portion may comprise two or more raised sections, divided for example by line 49, the minimal vertical dimension from the base being sufficient to receive the minimal thickness dimension of the cassette, while the maximum dimension is no greater than the height of raised portion 50 and 52. Located along the top edge in the raised portion 50 and/or 52 is a detent 53 or 54. The detent is formed as a part of pocket material and of such shape to fall within at least one of the cassette vertical openings 30, 32, 34 or 36 when inserted in the pocket, yet will easily release the cassette. Preferably the indentations 53 and 54 are shaped as a partial eclipse although this is not to be considered a limiting factor as other shapes such as spherical or semi-spherical are operable.

An arcuate opening 56 is provided at the open end of the pocket to allow the user to readily insert or remove the cassette from the pocket and is described in the aforesaid patent. An additional improvement is the provision of an arcuate opening 66 in the end 46 and/or top portion 48 to further provide assistance in removing the cassette from the pocket.

Although two detents 53 and 54 are shown and preferred so the cassette may be inserted and retained in either direction, at least one is required. The broad scope of this improvement is directed to detent holding holding means formed as a part of the pocket top side that will mesh with any vertical opening formed as a part of the cassette except the wind and re-wind reel openings.

Figure 5:
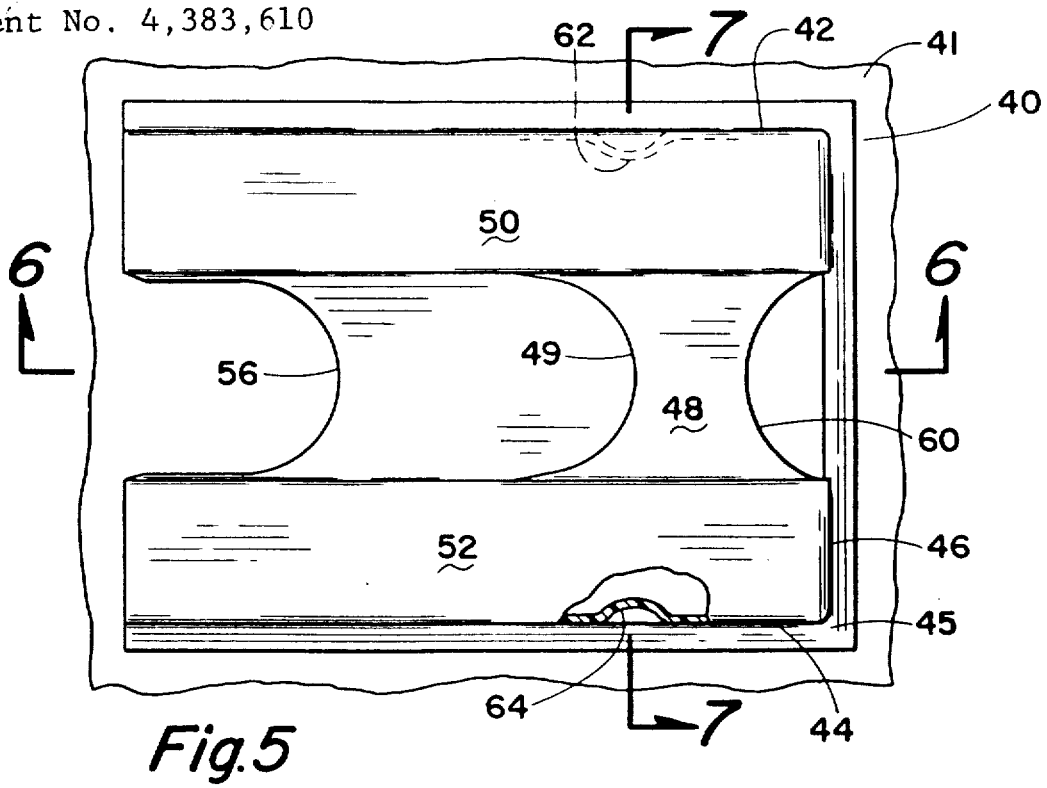
FIG. 5 is a top plan view partially cut away describing another embodiment of the invention.
Figure 6:
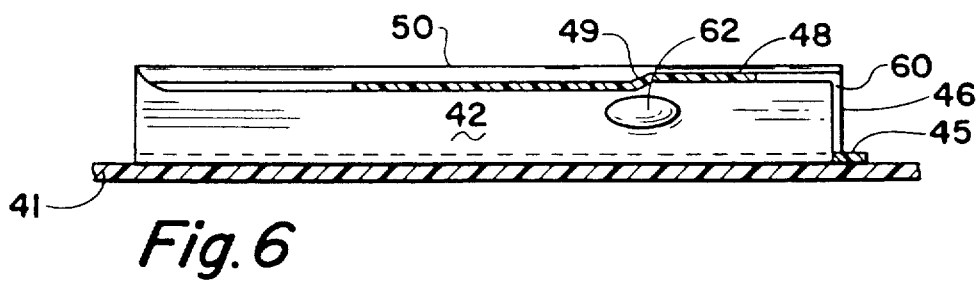
FIG. 6 is a sectional view taken along the line 6—6 of FIG. 5.
Figure 7:
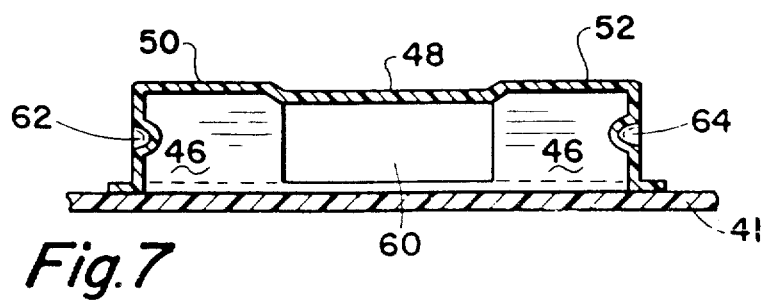
FIG. 7 is a sectional view taken along the line 7—7 of FIG. 5.

Referring now to FIGS. 5, 6 and 7 another embodiment is directed to at least one detent means 62 and/or 64 formed in the respective side walls 42 and 44 so as to mesh with any one of the openings 20, 22 or 24 but preferably that opening 22 or 24 that is nearest the end wall 46 no matter which way the cassette is inserted.

It is to be understood that the invention herein is directed to improvement in the pocket design, which pockets may be used in the manner disclosed in said U.S. Pat. No. 4,253,567 and is adaptable to use with mini and/or micro tape cassettes.

What is claimed is:

1. A container for holding rectangular cassette, said cassette formed to include a tape to recorder-playback intercept projection having a variety of vertical and horizontal openings, said container having identical side walls, a single end wall, a preformed top wall and an opened end wall forming a pocket for insertion of said cassette relative to a flat bottom wall, said top wall having a center portion spaced a given distance from said bottom wall and a pair of end portions each spaced a greater distance from said bottom wall than said center portion, the improvement comprising: at least one detent formed inwardly to mesh with at least one of horizontal openings of said cassette when said cassette is inserted in said pocket.

2. The container of claim 1 wherein at least one detent is formed in at least one end portion of said top wall so as to mesh with one of said vertical openings of said cassette.

3. The container of claim 2 wherein said detent is located so as to mesh with that said vertical opening which would be closest to said single end wall when said cassette is positioned in said pocket.

4. The container of claim 1 wherein said detent is formed in said side wall so as to mesh with one of said horizontal openings in said cassette.

5. The container of claim 4 wherein said detent is located so as to mesh with that said horizontal opening which would be closest to said single end wall when said cassette is positioned in said pocket.

* * * * *

UNITED STATES PATENT AND TRADEMARK OFFICE
CERTIFICATE OF CORRECTION

PATENT NO. : 4,383,610
DATED : May 17, 1983

INVENTOR(S) : Donald L. Boshears

It is certified that error appears in the above-identified patent and that said Letters Patent are hereby corrected as shown below:

Sheet 2 of the drawings is a duplication of sheet 1 and should read as shown on the attached copy.

Signed and Sealed this

Eleventh Day of October 1983

[SEAL]

Attest:

GERALD J. MOSSINGHOFF

Attesting Officer     Commissioner of Patents and Trademarks

Patent No. 4,383,610